(12) United States Patent
Fan et al.

(10) Patent No.: US 9,695,271 B2
(45) Date of Patent: *Jul. 4, 2017

(54) DISTILLED EPOXY NOVOLAC RESINS

(71) Applicant: BLUE CUBE IP LLC, Midland, MI (US)

(72) Inventors: William W. Fan, Lake Jackson, TX (US); Dennis W. Jewell, Angleton, TX (US); Stephen B. Wallace, Lake Jackson, TX (US); Marvin L. Dettloff, Lake Jackson, TX (US); Travis H. Larsen, Houston, TX (US)

(73) Assignee: BLUE CUBE IP LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/103,097

(22) PCT Filed: Dec. 17, 2014

(86) PCT No.: PCT/US2014/070919
§ 371 (c)(1),
(2) Date: Jun. 9, 2016

(87) PCT Pub. No.: WO2015/095369
PCT Pub. Date: Jun. 25, 2015

(65) Prior Publication Data
US 2016/0304660 A1    Oct. 20, 2016

Related U.S. Application Data

(60) Provisional application No. 61/917,650, filed on Dec. 18, 2013.

(51) Int. Cl.
C08G 64/00 (2006.01)
C08G 59/02 (2006.01)
C08G 59/08 (2006.01)
B01D 5/00 (2006.01)
B01D 3/32 (2006.01)
C08G 63/02 (2006.01)

(52) U.S. Cl.
CPC ............ *C08G 59/025* (2013.01); *B01D 3/32* (2013.01); *B01D 5/006* (2013.01); *C08G 59/08* (2013.01)

(58) Field of Classification Search
CPC ..................................... C08G 59/025
USPC ........................................ 528/480
See application file for complete search history.

(56) References Cited

U.S. PATENT DOCUMENTS

2016/0304661 A1* 10/2016 Fan ................ C08G 59/08

* cited by examiner

Primary Examiner — Terressa Boykin
(74) Attorney, Agent, or Firm — Polsinelli PC

(57) ABSTRACT

A continuous process comprising a) separating an epoxy novolac resin comprising oligomers having an average functionality of greater than 2.5 and a hydrolyzable chlorine content of less than 450 ppm with a continuous evaporator apparatus to form i) a first distillate vapor fraction comprising epoxy novolac resin having more than 75 weight percent of 2 functional components and wherein the mass of the first distillate vapor fraction is in the range of from 15 to 40 weight percent of the starting epoxy novolac resin; and ii) a first bottom fraction comprising epoxy novolac resin having less than 5 weight percent of 2 functional components and having a glass transition temperature of at least 15 C higher compared to the starting epoxy novolac resin when cured; b) recovering the first bottom fraction product; and c) condensing the first distillate vapor fraction to form a first condensed distillate vapor fraction; d) separating the first condensed distillate vapor fraction with a second continuous evaporator apparatus to form i) a second distillate vapor fraction wherein the mass of the second distillate vapor fraction is in the range of from 40 to 70 weight percent of the first condensed distillate vapor fraction; and ii) a second bottom fraction; e) recovering the second bottom fraction product; and f) condensing the second distillate vapor fraction to form a second condensed distillate vapor fraction product comprising at least 98 weight percent of 2 functional components with a total chlorine content less than 900 ppm, is disclosed.

5 Claims, 2 Drawing Sheets

DISTILLED EPOXY NOVOLAC RESINS

FIELD OF THE INVENTION

Embodiments of the present disclosure relate to epoxy novolac resins, and in particular to distilled epoxy novolac resins with reduced chlorine levels; distilled epoxy novolac resins with high Tg; and the continuous process for the production of both.

INTRODUCTION

There is a growing trend in the electronics industry towards the use of halogen-free materials for packaging and assembly applications. Halogen-free materials are defined by the International Electrochemical Commission (IEC) standard (IEC 61249-2-21) as containing less than 900 ppm chlorine, less than 900 ppm bromine, and less than 1500 ppm total combined chlorine and bromine. This trend is in response to the enactment of environmental regulations and increasing consumer demand for more environmentally responsible microelectronic devices. In addition to these market drivers, the reduction of halogens offers reliability performance improvements, as the presence of ionic impurities has been shown to accelerate the rate of corrosion-related failures.

Many of the materials used for electronics packaging and assembly applications contain epoxy resins as the organic binder. Traditional diglycidyl ether of bisphenol A (DGEBA) and diglycidyl ether of bisphenol F (DGEBF) resins contain greater than 1800 ppm total chlorine and contribute significantly to the total halogen content of the formulation.

Therefore, in order to meet the halogen-free specification and allow for formulation flexibility, there is an increasing demand for epoxy resins with reduced chlorine content.

Many of the epoxy materials used for laminates and composite applications are epoxy novolac resins to provide high Tg (glass transitition temperature) with their higher functionality. However, high functional materials typically have higher viscosity which presents many issues with processing and solvent miscibility. Therefore, a high Tg epoxy novolac resin with low viscosity is needed to facilitate the product introduction into existing formulations.

Epoxy novolac resins and processes for their preparation are well known. These resins typically have wide oligomer distributions (or functionality) and their corresponding properties depend upon the average functionality and the width of the oligomer distribution. To prepare an epoxy novolac resin having a particular average functionality, different ratios of aldehyde to phenolic hydroxyl containing compounds are employed. To prepare diglycidyl ether of bisphenol F (DGEBF) resins (functionality=2) in high purity, a ratio of 1:10 or higher of formaldehyde to phenol is often used leading to low reactor utilization and requiring extensive recovery of the high excess phenol.

Therefore, a process for preparing both high purity 2-functional resins with low chlorine content and high Tg epoxy resins would be desirable.

SUMMARY

The present invention relates to a process for preparing both DGEBF resin and in particular low chlorine DGEBF resin and a high Tg low viscosity epoxy novolac resin. This invention utilizes a continuous evaporation/condensation system to produce DGEBF resins with reduced chlorine levels from an epoxy novolac resin composed of an average functionality of 3.0-4.0. Thin film evaporation devices are used to separate the starting epoxy novolac resin into its 2-functional component (DGEBF) and higher oligomer components. The DGEBF resin thus obtained contains lower chlorine content than the starting material as the distillation also partitions most of the chlorines to the higher oligomer distillation fraction. In addition, light boiling chlorinated impurities can also be purged anywhere along this process to further reduce the chlorine content in the final DGEBF resin. The high Tg epoxy novolac resin thus obtained has a greater than 15° C. Tg increase compared to the original epoxy novolac resin when cured and an equivalent viscosity temperature increase of less than 25° C. However the total chlorine content of the starting material is concentrated in the higher oligomer fraction which necessitates the use of a starting epoxy novolac resin with less than 450 ppm hydrolyzable chlorine.

In one broad embodiment of the present invention, there is disclosed a continuous process comprising, consisting of, or consisting essentially of a) separating a starting epoxy novolac resin comprising oligomers having an average functionality of greater than 2.5 and a hydrolyzable chlorine content of less than 450 ppm with a continuous evaporator apparatus under vaporization temperature in the range of from 150° C. to 300° C. and an absolute pressure of from 0.05 to 1 mmHg absolute to form i) a first distillate vapor fraction comprising epoxy novolac resin having more than 75 weight percent of 2 functional components and wherein the mass of the first distillate vapor fraction is in the range of from 15 to 40 weight percent of the starting epoxy novolac resin; and ii) a first bottom fraction comprising epoxy novolac resin having less than 5 weight percent of 2 functional components and having a glass transition temperature of at least 15° C. higher compared to the starting epoxy novolac resin; b) recovering the first bottom fraction product; c) condensing the first distillate vapor fraction in the temperature range of from 30° C. to 150° C. to form a first condensed distillate vapor fraction; d) separating the first condensed distillate vapor fraction with a second continuous evaporator apparatus under vaporization temperature in the range of from 150° C. to 250° C. and an absolute pressure of from 0.05 to 1 mmHg absolute conditions to form i) a second distillate vapor fraction wherein the mass of the second distillate vapor fraction is in the range of from 40 to 70 weight percent of the first condensed distillate vapor fraction; and ii) a second bottom fraction; e) recovering the second bottom fraction product; and f) condensing the second distillate vapor fraction in the temperature range of from 50° C. to 150° C. to form a second condensed distillate vapor fraction product comprising at least 98 weight percent of 2 functional components with a total chlorine content less than 900 ppm.

In another embodiment of the present invention, there is disclosed a continuous process comprising, consisting of, or consisting essentially of a) separating a starting epoxy novolac resin comprising oligomers having an average functionality of greater than 2.5 and a hydrolzable chlorine content of less than 450 ppm with a continuous evaporator apparatus under vaporization temperature in the range of from 150° C. to 300° C. and an absolute pressure of from 0.05 to 1 mmHg absolute to form i) a first distillate vapor fraction comprising epoxy novolac resin having more than 75 weight percent of 2 functional components and wherein the mass of the first distillate vapor fraction is in the range of from 15 to 40 weight percent of the starting epoxy novolac resin; and ii) a first bottom fraction comprising epoxy novolac resin having less than 5 weight percent of 2 functional component content and having a glass transition temperature of at least 15° C. higher compared to the starting epoxy novolac resin when cured; b) recovering the first bottom fraction product; c) condensing the first distillate vapor fraction in the temperature range of from 30° C. to 150° C. to form a first condensed distillate vapor fraction; d) separating the first condensed distillate vapor fraction with a second continuous evaporator apparatus under vaporization temperature in the range of from 150° C. to 250° C. and an absolute pressure of from 0.05 to 1 mmHg absolute conditions to form i) an second distillate vapor fraction comprising halogenated impurities wherein the mass of second distillate vapor fraction is in the range of from 0.05 to 5 weight percent of the first condensed distillate vapor fraction product; and ii) a second bottom fraction comprising at least 75 weight percent of 2 functional components; e) recovering the second bottom fraction; f) separating the second bottom fraction with a third continuous evaporator apparatus under vaporization temperature in the range of from 150° C. to 250° C. and an absolute pressure of from 0.05 to 1 mmHg absolute conditions to form i) a third vapor fraction wherein the mass of the second distillate vapor fraction is in the range of from 40 to 70 weight percent of the second bottom fraction ; and ii) a third bottom fraction; g) recovering the third bottom fraction product; and h) condensing the third distillate vapor fraction in the temperature range of from 30° C. to 150° C. to form a third condensed vapor fraction product comprising at least 98 weight percent of 2 functional components with a total chlorine content less than 700 ppm.

DETAILED DESCRIPTION

In various embodiments, the starting material is an epoxy novolac resin. In an embodiment, the starting material comprises epoxy phenol novolac oligomers. Examples of epoxy phenol novolacs include, but are not limited to epoxy phenol novolac (EPN) and bisphenol-F epoxy resins. Furthermore, it can comprise other epoxy resins for example, bisphenol-A epoxy resins.

The general structure of an epoxy phenol novolac is shown in Formula I, below.

The starting epoxy novolac resin comprises oligomers having an average functionality of greater than 2.1. In various other embodiments, the average functionality is from 2.5 to 5.0, preferably from 3.0 to 4.0, most preferably from 3.5 to 4.0. In addition, the hydrolyzable chlorine content of the starting epoxy novolac resin comprises less than 450 ppm, preferably less than 350 ppm, most preferably less than 250 ppm. The term 'chlorine' also includes any ionic chlorides that may be present. The hydrolyzable chlorine content of the starting epoxy novolac resin can be reduced by any conventional means, for example, a post treatment with caustic. Furthermore, the total chlorine content of the starting epoxy novolac resin comprises less than 1800 ppm, preferably less than 1650 ppm, most preferably less than 1500 ppm.

Figure 1:
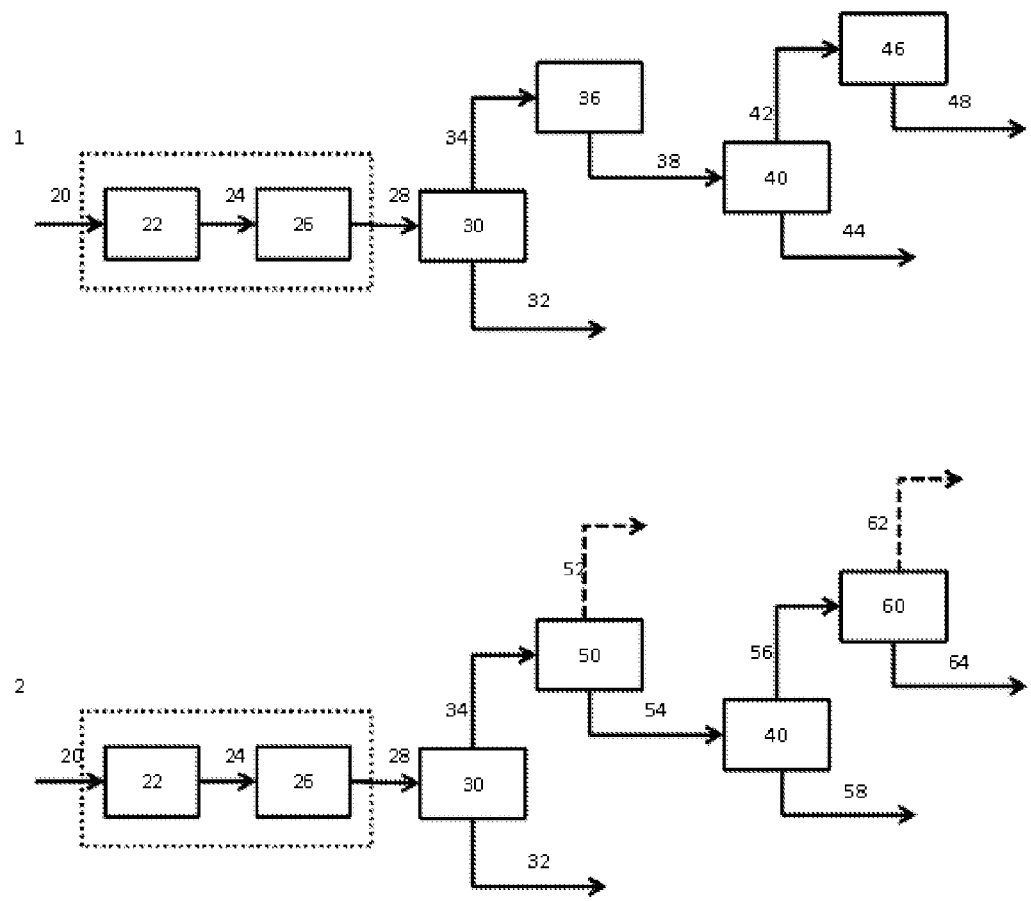
FIG. 1 depicts two evaporation/condensation systems.

FIG. 1 represents evaporation/condensation system 1. In an embodiment, the starting epoxy novolac resin can be contacted with an optional heater 22 via conduit 20 and can also be optionally contacted with degasser 26 via conduit 24. The optional preheater can be operated at a temperature in the range of from 50° C. to 200° C. and an absolute pressure of from 0.1 to 50 mmHg. The optional degasser can be operated at a temperature in the range of from 150° C. to 250° C. and an absolute pressure of from 0.1 to 20 mmHg. The degasser can be used to remove dissolved gases and uncondensables to avoid pressure build and fluctuation in the evaporation step. Furthermore in an embodiment, the degasser can also be used to remove halogenated light boiling components from the starting epoxy novolac resin resulting in lower chlorines in the final product. These halogenated light boiling components comprise non-aromatic impurities, such as for example, by-product derivatives of epichlorohydrin.

The starting epoxy novolac resin is then contacted with continuous evaporator 30 under a vaporization temperature in the range of from 150° C. to 300° C. and an absolute pressure of from 0.05 to 1 mmHg absolute via conduit 28 to form a first distillate vapor fraction comprising epoxy novolac resin having more than 75 weight percent of 2-functional components and a mass which is in the range of from 15 to 40 weight percent of the starting epoxy novolac resin, 20 to 30 weight percent in another embodiment, and 20 to 25 weight percent in yet another embodiment and a first bottom fraction comprising epoxy novolac resin having less than 5 weight percent of 2-functional components and having a glass transition temperature of at least 15° C. higher compared to the starting epoxy novolac resin when cured. The first bottom fraction is recovered via conduit 32. The first distillate vapor fraction is then contacted with condenser 36 in the temperature range of from 30° C. to 150° C. via conduit 34 to form a first condensed vapor fraction. The condenser should preferably be designed for low pressure drop in high vacuum operations. This first condensed vapor fraction is then contacted with second continuous evaporator 40 under vaporization temperature in the range of from 150° C. to 250° C. and an absolute pressure of from 0.05 to 1 mmHg absolute via conduit 38 to form a second distillate vapor fraction wherein the mass of the second distillate vapor fraction is in the range of from 40 to 70 weight percent of the first condensed vapor fraction and a second bottom fraction. The second bottom fraction is

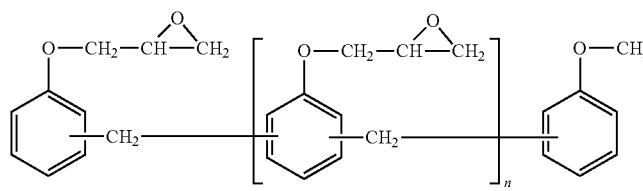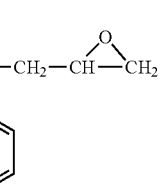

Formula I recovered via conduit 44. The second distillate vapor fraction is then contacted with second condenser 46 in the temperature range of from 30° C. to 150° C. via conduit 42 to form a second condensed vapor fraction product comprising at least 98 weight percent of 2-functional components with a total chlorine content less than 900 ppm, which can then be recovered via conduit 48. In various other embodiments, condenser 36 can be replaced with partial condenser 50 and/or second condenser 46 can be replaced with second partial condenser 60. This is depicted in system 2 of FIG. 1 and would result in the second condensed vapor fraction product comprising a total chlorine content less than 700 ppm. In one embodiment, the partial condenser has an exchange area in the range of from 0.1 to 0.9, preferably from 0.1 to 0.5 of the corresponding evaporator exchange area. The partial condenser should preferable designed for low pressure drop in high vacuum operation.

Figure 2:
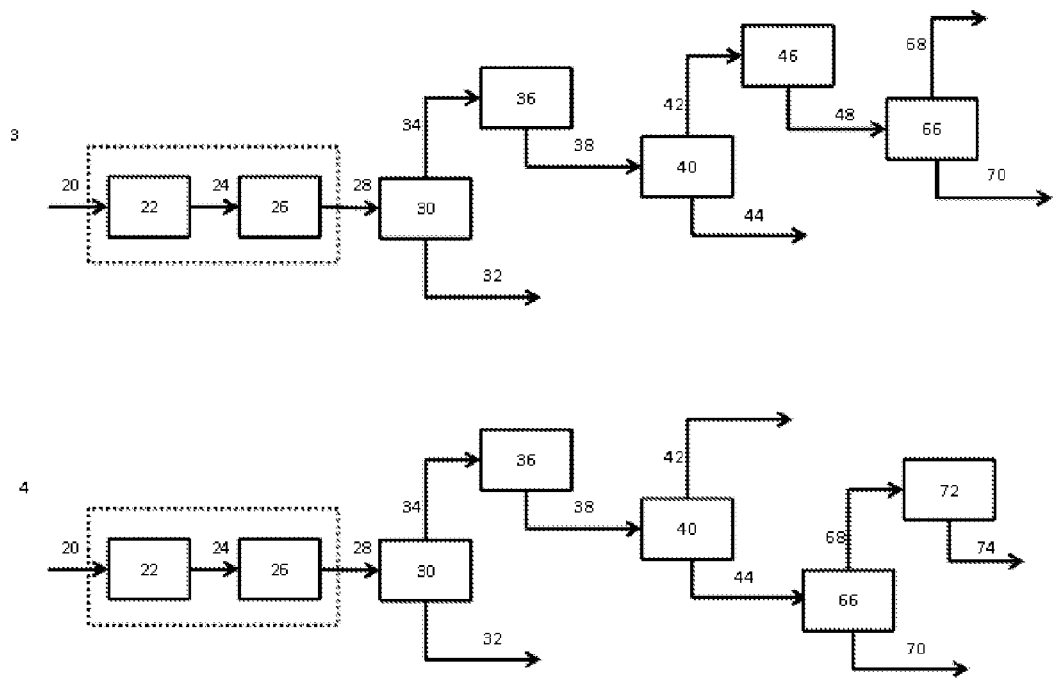
FIG. 2 depicts two evaporation/condensation systems.

In yet another embodiment, depicted in system 3 shown in FIG. 2, the second condensed vapor fraction is contacted with evaporator 66 under vaporization temperature in the range of from 150° C. to 250° C. and an absolute pressure of from 0.05 to 1 mmHg absolute via conduit 48 to form an uncondensed vapor product having a mass in the range of from 0.05 to 5 weight percent of the second condensed distillate vapor product, which is then recovered via conduit 68. Also formed is a bottom fraction comprising at least 98 weight percent of 2-functional components with a total chlorine content of less than 700 ppm, which is then recovered via conduit 70. In yet another embodiment, there is disclosed system 4 in FIG. 2. The first condensed vapor fraction is contacted with evaporator 40 under vaporization temperature in the range of from 150° C. to 250° C. and an absolute pressure of from 0.05 to 1 mmHg absolute via conduit 38 to form a second vapor fraction comprising halogenated impurities and a second bottom fraction comprising at least 75 weight percent of 2-functional components. The second vapor fraction can be recovered via conduit 42. The second bottom fraction is then contacted with evaporator 66 under vaporization temperature in the range of from 150° C. to 250° C. and an absolute pressure of from 0.05 to 1 mmHg absolute via conduit 44 to form a third vapor fraction wherein the mass of the third vapor fraction is in the range of from 40 to 70 weight percent of the second bottom fraction and a third bottom fraction. The third bottom fraction is recovered via conduit 70. The third vapor fraction is contacted with condenser 72 in the temperature range of from 30° C. to 150° C. via conduit 68 to form a third condensed vapor fraction product comprising at least 98 weight percent of 2 functional components with a total chlorine content of less than 700 ppm.

In various embodiments, the feed can optionally be contacted with a heater and/or degasser before it comes in contact with any of the evaporators. In an embodiment, one or more of the continuous evaporators can comprise of low residence time and low pressure drop devices such as a thin film evaporator. Furthermore, the evaporator apparatus can comprises of an evaporator and a condenser such as a wiped film evaporator, falling film evaporator, or a short path evaporator.

The resulting products can be used in electrical laminate, electronics, coatings, and composite applications.

EXAMPLE

An epoxy novolac produced from a phenol to formaldehyde ratio of 2.2:1 was used as the feed with an oligomer distribution of 3.6 functionality and a 2 functional content of 22.2%. The feed also had a hydrolyzable chlorine content of 190 ppm and a total chlorine content of 1640 ppm. The short path wiped film evaporation apparatus used was a 6" unit with a heating transfer area of 0.2 m$^2$ and a heating to cooling transfer area of 1:1. The pressure was set at 1 mmHg with a rpm of 300. The cold finger condenser was set at 50° C. A hot oil jacketed system was used to heat the short path to the desire overhead split ratio. The feed rate of the epoxy novolac resin was from 15 to 18 kg/hr. As can be seen in Table 1 below, both a low chlorine and a high Tg product are produced.

TABLE 1

| | split | 2-F content | | resin |
|---|---|---|---|---|
| | Dist/Feed wt:wt | bottom wt % | distillate wt % | total Cl— ppm |
| 1$^{st}$ Pass | 0.20 | 4.3% | 94.4% | 1241 |
| 2$^{nd}$ Pass on Distillate | 0.62 | 92.0% | 99.4% | 879 |
| 3$^{rd}$ Pass on Distillate | 0.02 | 99.0% | | 644 |

Analytical Methods
Chlorine Quantification

Hydrolyzable chlorine content of the liquid epoxy resins was measured according to ASTM D1726 (Test Method B). Total chlorine content was measured using a titration-based method, which has been shown to provide statistically equivalent results to the standard ASTM D4301 method.

The first step of the titration method involves dissolving 1 g of resin into 50 mL of dimethylformamide (DMF) and 5 mL of 1N KOH in ethanol solution in a round bottom flask.

The flask is then attached to a water-cooled condenser, heated until the sample begins boiling, and then refluxed for 5 min. After the flask has cooled, the condenser is rinsed with approximately 20 mL of acetone, and the contents are transferred to a disposable beaker. The solution is neutralized using bromocresol green indicator and adding a 1:1 HNO$_3$/H$_2$O solution dropwise until the solution changes from blue to yellow. Titration is performed using an automatic titrator with a combination silver electrode and 0.0025N AgNO$_3$ as the titrant.

Functionality

The functionality was determined by the GPC using a Viscotek GP Max equipped with a TDA 302 detector array which included a refractive index detector, a viscosity detector, and a RALLS (right angle laser light scattering detector). Separation was achieved using 2 PLgel 3um mixed E, 300×7.5 mm analytical columns. Tetrahydrofuran (THF), inhibited with 250 ppm BHT was used as the mobile phase. The sample was dissolved in mobile phase (1%) and filtered. The instrument was calibrated using Viscotek 115K polystyrene standards.

The invention claimed is:
1. A continuous process comprising:
  a) separating a starting epoxy novolac resin comprising oligomers having an average functionality of greater than 2.5 and a hydrolyzable chlorine content of less than 450 ppm with a continuous evaporator apparatus under vaporization temperature in the range of from 150° C. to 300° C. and an absolute pressure of from 0.05 to 1 mmHg absolute to form
   i) a first distillate vapor fraction comprising epoxy novolac resin having more than 75 weight percent of 2 functional components and wherein the mass of the first distillate vapor fraction is in the range of from 15 to 40 weight percent of the starting epoxy novolac resin; and ii) a first bottom fraction comprising epoxy novolac resin having less than 5 weight percent of 2 functional components and having a glass transition temperature of at least 15° C. higher compared to the starting epoxy novolac resin when cured;

b) recovering the first bottom fraction product;

c) condensing the first distillate vapor fraction in the temperature range of from 30° C. to 150° C. to form a first condensed distillate vapor fraction;

d) separating the first condensed distillate vapor fraction with a second continuous evaporator apparatus under vaporization temperature in the range of from 150° C. to 250° C. and an absolute pressure of from 0.05 to 1 mmHg absolute conditions to form i) a second distillate vapor fraction wherein the mass of the second distillate vapor fraction is in the range of from 40 to 70weight percent of the first condensed distillate vapor fraction; and ii) a second bottom fraction;

e) recovering the second bottom fraction product; and f) condensing the second distillate vapor fraction in the temperature range of from 30° C. to 150° C. to form a second condensed distillate vapor fraction product comprising at least 98 weight percent of 2 functional components with a total chlorine content less than 900 ppm.

2. A continuous process in accordance with claim 1 wherein the condensing units of step c) is a partial condenser separating an uncondensed vapor product having a mass in the range of from 0.05 to 5 weight percent of the first distillate vapor fraction.

3. A continuous process in accordance with claim 1 wherein the condensing unit of step f) is a partial condenser separating an uncondensed vapor product having a mass in the range of from 0.05 to 5 weight percent of the second distillate vapor fraction resulting in the second condensed distillate vapor fraction product of step f) comprising at least 98 weight percent of 2 functional components with a total chlorine content less than 700 ppm.

4. A continuous process in accordance with claim 1, further comprising:

g) separating the second condensed distillate vapor fraction with a third continuous evaporator apparatus under vaporization temperature in the range of from 150° C. to 250° C. and an absolute pressure of from 0.05 to 1 mmHg absolute conditions to form i) an uncondensed vapor product wherein the mass of the uncondensed vapor product is in the range of from 0.05 to 5 weight percent of the second condensed distillate vapor fraction product; and ii) a third bottom fraction comprising at least 98 weight percent of 2 functional components with a total chlorine content less than 700 ppm; and e) recovering the third bottom fraction product.

5. A continuous process comprising:

a) separating a starting epoxy novolac resin comprising oligomers having an average functionality of greater than 2.5 and a hydrolysable chlorine content of less than 450 ppm with a continuous evaporator apparatus under vaporation temperature in the range of from 150° C. to 300° C. and an absolute pressure of from 0.05 to 1 mmHg absolute to form i) a first distillate vapor fraction comprising epoxy novolac resin having more than 75 weight percent of 2 functional components and wherein the mass of the first distillate vapor fraction is in the range of from 15 to 40 weight percent of the starting epoxy novolac resin; and ii) a first bottom fraction comprising epoxy novolac resin having less than 5 weight percent of 2 functional component content and having a glass transition temperature of at least 15° C. higher compared to the starting epoxy novolac resin when cured;

b) recovering the first bottom fraction product;

c) condensing the first distillate vapor fraction in the temperature range of from 30° C. to 150° C. to form a first condensed distillate vapor fraction;

d) separating the first condensed distillate vapor fraction with a second continuous evaporator apparatus under vaporization temperature in the range of from 150° C. to 250° C. and an absolute pressure of from 0.05 to 1 mmHg absolute conditions to form i) an second distillate vapor fraction comprising halogenated impurities wherein the mass of second distillate vapor fraction is in the range of from 0.05 to 5 weight percent of the first condensed distillate vapor fraction product; and ii) a second bottom fraction comprising at least 75 weight percent of 2 functional components;

e) recovering the second bottom fraction;

f) separating the second bottom fraction with a third continuous evaporator apparatus under vaporization temperature in the range of from 150° C. to 250° C. and an absolute pressure of from 0.05 to 1 mmHg absolute conditions to form i) a third vapor fraction wherein the mass of the second distillate vapor fraction is in the range of from 40 to 70weight percent of the second bottom fraction; and ii) a third bottom fraction;

g) recovering the third bottom fraction product; and h) condensing the third distillate vapor fraction in the temperature range of from 30° C. to 150° C. to form a third condensed vapor fraction product comprising at least 98 weight percent of 2 functional components with a total chlorine content less than 700 ppm.

* * * * *